US012651088B2

(12) United States Patent (10) Patent No.: US 12,651,088 B2
Matsumoto et al. (45) Date of Patent: Jun. 9, 2026

(54) INFORMATION PROCESSING DEVICE

(71) Applicant: TOYOTA JIDOSHA KABUSHIKI KAISHA, Toyota (JP)

(72) Inventors: Shigeki Matsumoto, Nagoya (JP); Naoya Oka, Nagakute (JP); Hidetaka Eguchi, Nagoya (JP); Shigeru Ichikawa, Nagoya (JP); Takeshi Yamada, Nagoya (JP); Masayo Nagai, Nagoya (JP); Ryosuke Yamamoto, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/808,225

(22) Filed: Aug. 19, 2024

(65) Prior Publication Data

US 2025/0068765 A1 Feb. 27, 2025

(30) Foreign Application Priority Data

Aug. 22, 2023 (JP) ................................. 2023-134804

(51) Int. Cl.
*G06F 21/62* (2013.01)
(52) U.S. Cl.
CPC ................................ *G06F 21/6245* (2013.01)
(58) Field of Classification Search
CPC ................................................. G06F 21/6245
See application file for complete search history.

(56) References Cited

U.S. PATENT DOCUMENTS

| | | | |
|---|---|---|---|
| 2014/0129629 A1* | 5/2014 | Savir ........................ | H04W 4/21 709/204 |
| 2014/0309806 A1* | 10/2014 | Ricci ........................ | G06F 21/31 701/1 |
| 2015/0341290 A1* | 11/2015 | Cherifi .................... | H04W 4/12 709/206 |
| 2016/0059864 A1* | 3/2016 | Feit ...................... | H04M 1/6075 701/36 |
| 2019/0195644 A1* | 6/2019 | Scheufler .............. | H04L 63/105 |
| 2019/0289435 A1 | 9/2019 | Tada et al. | |
| 2020/0273073 A1 | 8/2020 | Takebayashi | |
| 2022/0016999 A1* | 1/2022 | Burk .................... | B60N 2/0273 |
| 2023/0214521 A1* | 7/2023 | Amico ................... | G06Q 50/40 726/1 |
| 2023/0305578 A1* | 9/2023 | Melin ................... | B60N 2/0276 |
| 2024/0044660 A1* | 2/2024 | Kubo ................... | G01C 21/343 |
| 2025/0348619 A1* | 11/2025 | Amico ................. | H04W 12/02 |

FOREIGN PATENT DOCUMENTS

| | | |
|---|---|---|
| JP | 2019-164475 A | 9/2019 |
| JP | 2020-135813 A | 8/2020 |

* cited by examiner

*Primary Examiner* — Darren B Schwartz
(74) *Attorney, Agent, or Firm* — Sughrue Mion, PLLC

(57) ABSTRACT

The present disclosure relates to an information processing device. A control unit configured to set a policy for providing information regarding a plurality of users riding in the same vehicle in accordance with information transmitted from terminals of the plurality of users. It is checked whether or not a plurality of users agrees to provide information.

7 Claims, 6 Drawing Sheets

221 VEHICLE INFORMATION

| VEHICLE ID | POSITION | DESTINATION |
|---|---|---|
| xxx | xxx | xxx |
| . . . | . . . | . . . |

222 USER INFORMATION

| USER ID | NAME | ADDRESS | E-MAIL ADDRESS |
|---|---|---|---|
| xxx | xxx | xxx | xxx |
| . . . | . . . | . . . | . . . |

22

INFORMATION PROCESSING DEVICE

CROSS-REFERENCE TO RELATED APPLICATION

This application claims priority to Japanese Patent Application No. 2023-134804 filed on Aug. 22, 2023, incorporated herein by reference in its entirety.

BACKGROUND

1. Technical Field

The present disclosure relates to an information processing device.

2. Description of Related Art

There is known a technique of providing information in consideration of the relationship between a plurality of persons (Japanese Unexamined Patent Application Publication No. 2019-164475 (JP 2019-164475 A), for example).

SUMMARY

An object of the present disclosure is to protect personal information more appropriately.

An aspect of the present disclosure provides an information processing device including a control unit configured to set a policy for providing information about a plurality of users riding on the same vehicle according to information transmitted from each of terminals of the users.

Other aspects of the present disclosure provide an information processing method performed by the information processing device, a program that causes a computer to execute the information processing method, and a storage medium storing the program in a non-transitory manner.

According to the present disclosure, it is possible to protect personal information more appropriately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating an example of vehicle information and user information stored in a storage unit of a server;

DETAILED DESCRIPTION OF EMBODIMENTS

Figure 1:
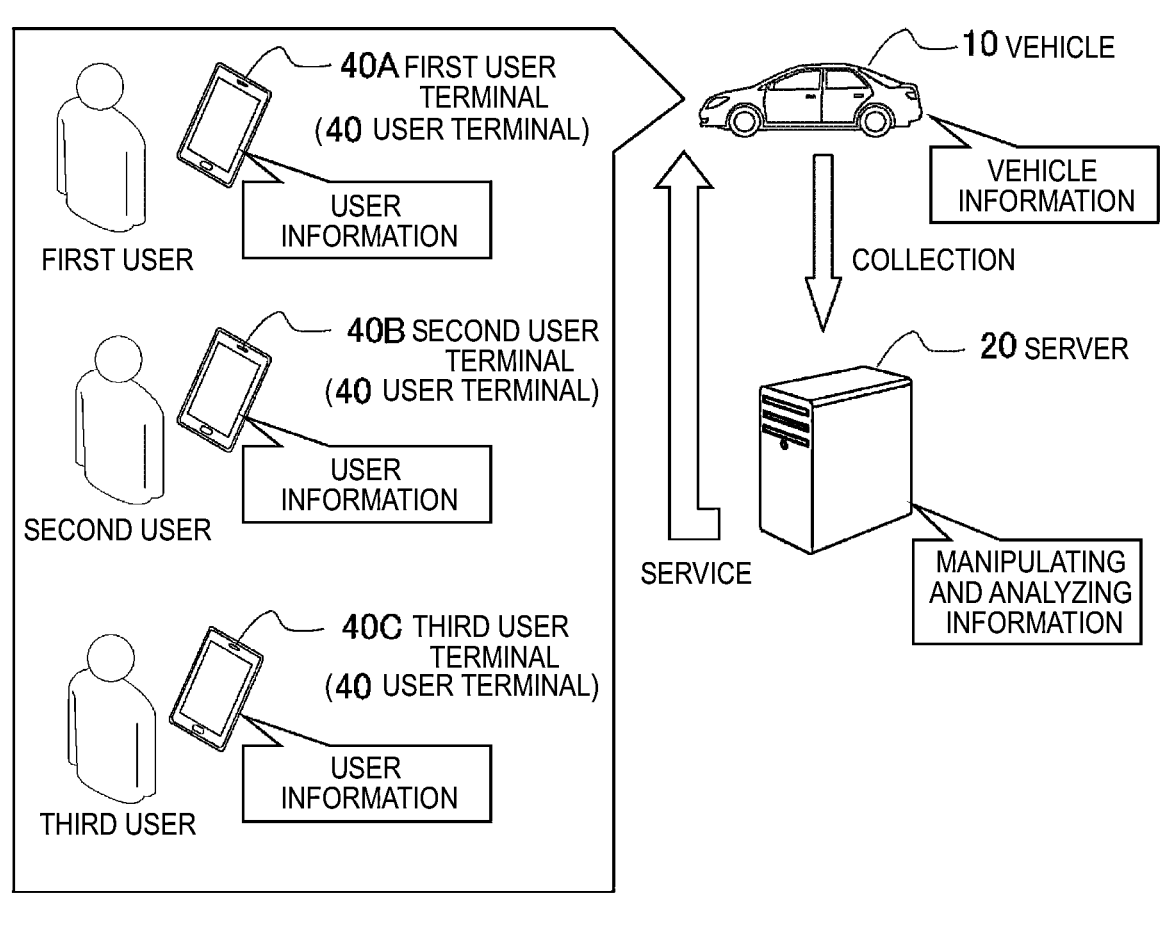
FIG. 1 is a diagram illustrating an outline of a flow of information in a system according to a first embodiment.

Information transmitted from a vehicle is analyzed to provide a service to a user of the vehicle. The information includes information acquired by a sensor or the like of the vehicle, information about a route or a destination set in the navigation system of the vehicle, and information about a user of the vehicle. Here, when information is transmitted from a vehicle, a user of the vehicle may include a person who does not want to provide personal information. Even if the driver of the vehicle agrees to send the information, the passenger does not necessarily agree. However, whether or not to provide personal information is often left to the driver. Therefore, even when the passenger does not desire to provide the personal information, the personal information may be provided.

Therefore, an information processing device according to an aspect of the present disclosure includes a control unit configured to set a policy for providing information regarding a plurality of users riding in the same vehicle in accordance with information transmitted from terminals of the plurality of users.

Users may include, for example, user ID, names, ages, genders, addresses, telephone numbers, email addresses, social media accounts, and the like. In addition, the information provided from the vehicle to the outside may include information about the vehicle in addition to the information about the user. The information on the vehicle includes a detection value of a sensor attached to the vehicle, a route and a destination of the vehicle input to the navigation system, and the like.

The information transmitted from each of the terminals of the plurality of users includes information on whether or not to agree to provide information on the user (hereinafter, also referred to as user information), or information on whether or not to agree to provide the user information is requested (or requested) from another user. For example, it may be determined whether or not a plurality of users each agree to provide the user information and transmit the user information to the information processing device via a terminal of each user. Further, as another example, a representative may be determined from a plurality of users, and whether or not to agree with the provision of the user information may be transmitted from the terminal of the representative to the information processing device. The representative may collect an answer as to whether or not to agree to the provision of the user information from the terminal of each user, and transmit the result, or may determine whether or not the representative agrees to the provision of the user information based on his/her own judgment, and transmit the result.

In this way, it is possible to set a policy of providing information according to the intention of each of a plurality of users riding on the same vehicle.

The control unit may set a policy of transmitting, when all of the plurality of users receive information indicating that all of the plurality of users agree to provide the information regarding the plurality of users from at least one of the terminals, the information regarding the vehicle in association with the information regarding the plurality of users, and may set a policy of transmitting, when the information indicating that at least a part of the plurality of users does not agree to provide the information regarding the plurality of users is received from at least one of the terminals, the information regarding the vehicle without association with the information regarding the plurality of users.

That is, only when all users agree to provide the information, a policy is set so as to transmit the information on the vehicle to which the information on the user is associated. On the other hand, when at least a part of the user does not agree to provide the information, the information about the user is not transmitted when the information about the vehicle is transmitted. Note that, as will be described later, when the representative agrees to provide information, information indicating that the representative agrees to provide information is transmitted from at least one terminal that is a terminal of the representative. In this case, the information received from the terminal of the representative may include information capable of determining whether or not all users agree to provide the information.

In addition, a terminal of a representative of the plurality of users may receive information transmitted from the terminals of the plurality of users, and the control unit may set the policy according to the information transmitted from the terminals of the representative. Since the information transmitted from the terminal of the representative is considered to be information reflecting the intention of all users, a policy can be set in accordance with the information.

The control unit may generate an incentive corresponding to the plurality of users according to the set policy. Providing the user with an incentive to provide the user information may trigger the user to provide the information.

Further, the policy may be reset in response to a change in a plurality of users riding on the same vehicle. Depending on the combination of users, there may also be users who refuse to provide information. Therefore, if the user wants to get in and out of the vehicle or the user wants to get in, the policy is set again. In this case as well, the policy is set in accordance with the information transmitted from the terminals of the plurality of users.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

First Embodiment

FIG. 1 is a diagram illustrating an outline of a flow of information in a system 1 according to a first embodiment. In the example of FIG. 1, the system 1 includes a vehicle 10, a server 20, and a user terminal 40. In the vehicle 10, information is acquired by a sensor that detects a state of the vehicle 10, a sensor that detects position information, or the like. In addition, the vehicle 10 stores information related to the user. The information is transmitted from the vehicle 10 to the server 20. The server 20 is a server that collects information from the vehicle 10, analyzes the information, and provides a service to the vehicle 10 or the user terminal 40.

For example, the server 20 generates an advertisement matching the destination of the vehicle 10, and transmits the advertisement to the vehicle 10 or the user terminal 40. The user terminal 40 includes a first user terminal 40A, a second user terminal 40B, and a third user terminal 40C. The first user terminal 40A is a terminal carried by the first user, the second user terminal 40B is a terminal carried by the second user, and the third user terminal 40C is a terminal carried by the third user. The first user, the second user, and the third user are users riding on the vehicle 10. For example, the first user is a driver, and the second user and the third user are passengers. In the following description, when the first user terminal 40A, the second user terminal 40B, and the third user terminal 40C are not distinguished from each other, they are simply referred to as user terminals 40. Further, the number of user terminals 40 is not limited to three illustrated in FIG. 1. A plurality of users 15 on the vehicle 10 may each possess the user terminals 40.

The vehicles 10, the servers 20, and the user terminals 40 are connected to each other via a network N1. Note that the network N1 may be, for example, a global public communication network such as the Internet Wide Area Network (WAN) or another communication network. In addition, the network N1 may include a telephone communication network such as a mobile phone network and a wireless communication network such as Wi-Fi (registered trademark). Further, the vehicle 10 and the user terminal 40 may be connected by short-range wireless communication. In addition, the user terminals 40 may be connected to each other by short-range wireless communication.

Figure 2:
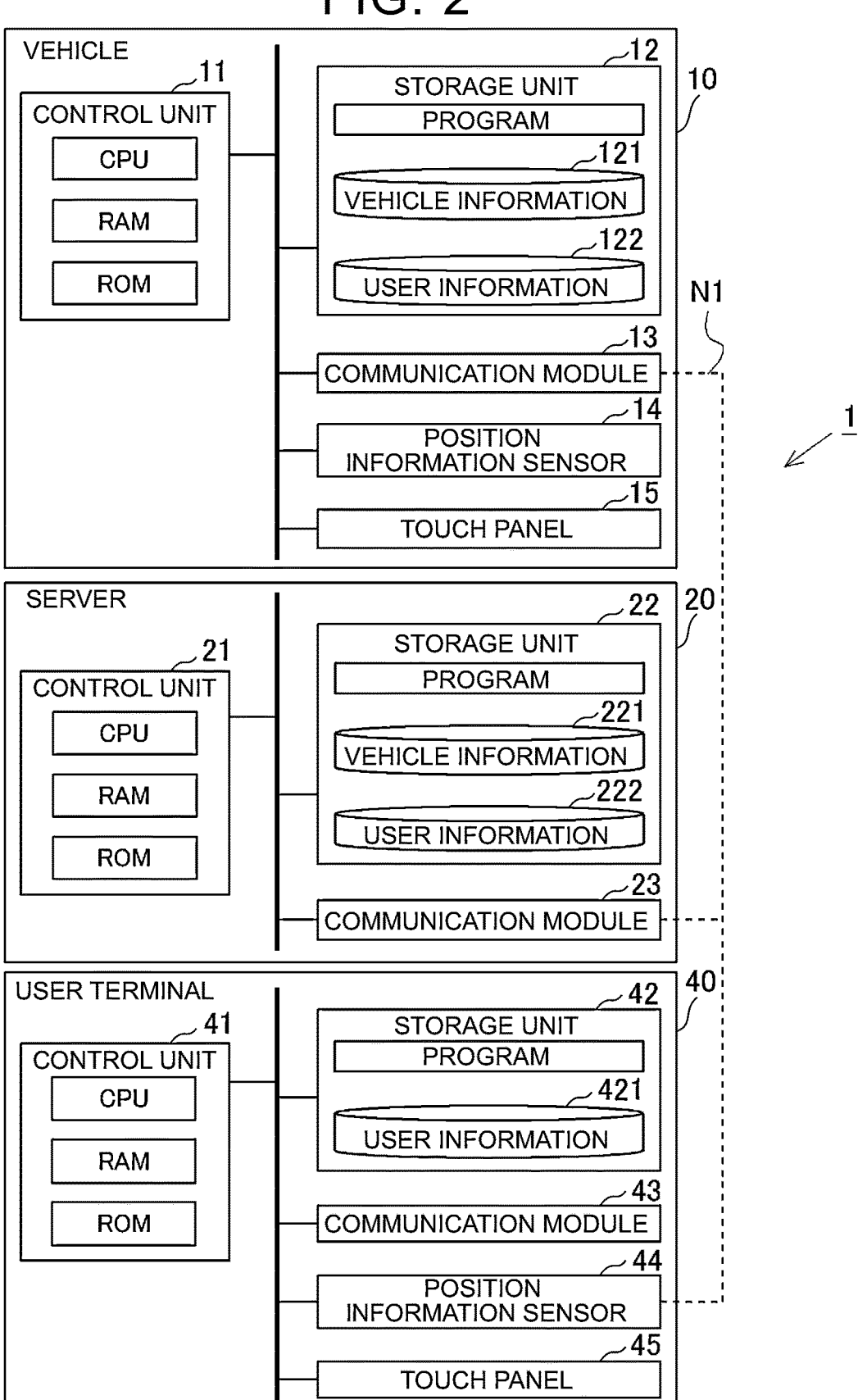
FIG. 2 is a block diagram schematically illustrating an example of a configuration of each of a vehicle, a server, and a user terminal constituting the system according to the first embodiment.

FIG. 2 is a block diagram schematically illustrating an example of the configuration of each of the vehicle 10, the server 20, and the user terminal 40 constituting the system 1 according to the first embodiment. The server 20 can be configured by a computer. That is, the servers 20 can be configured as computers having processors such as Central Processing Unit (CPU) and Graphics Processing Unit (GPU), main storage devices such as Random Access Memory (RAM) and Read Only Memory (ROM), Erasable Programmable Read-Only Memory (EPROM), and secondary storage devices such as hard disk drives and removable media. The auxiliary storage device stores an operating system (OS), various programs, various tables, and the like, loads the programs stored in the auxiliary storage device into a work area of the main storage device, executes the programs, and controls the respective constituent units and the like through the execution of the programs, thereby realizing respective functions that meet predetermined objectives. However, some or all of the functions may be realized by hardware circuitry such as Application Specific Integrated Circuit (ASIC) or Field Programmable Gate Array (FPGA).

The server 20 includes a control unit 21, a storage unit 22, and a communication module 23. The control unit 21 is an arithmetic unit that controls the control performed by the server 20. The control unit 21 can be realized by an arithmetic processor such as a CPU. The control unit 21 may include a RAM, ROM, a cache memory, and the like.

The storage unit 22 includes a main storage device and an auxiliary storage device. The main storage device is a memory in which a program executed by the control unit 21 and data used by the control program are loaded. The auxiliary storage device is a device in which a program executed by the control unit 21 and data used by the control program are stored.

In addition, the storage unit 22 stores vehicle information 221 and user information 222. FIG. 3 is a diagram illustrating an example of the vehicle information 221 and the user information 222 stored in the storage unit 22 of the server 20. The vehicle information 221 is information related to the vehicle 10. The vehicle information 221 includes information on a vehicle ID, a position of the vehicle 10, and a destination. The user information 222 is information about a user. The user information 222 includes personal information. The user information 222 includes information on a user ID, a name, an address, and an e-mail address. The user information 222 is associated with the vehicle information 221 of the vehicle 10 on which the user is riding. The vehicle ID is an identifying symbol of the vehicle 10. The position of the vehicle 10 is a position detected in the vehicle 10. The destination of the vehicle 10 is, for example, a destination input to the navigation system. In addition, the user ID is an identification symbol of the respective users riding on the vehicles 10. When a plurality of users rides on the same vehicle 10, records corresponding to the respective users are generated. The name is the name of each user. The address is an address of each user. The e-mail address is an e-mail address that can be communicated to each user. The vehicle information 221 and the user information 222 are transmitted from the vehicle 10 at predetermined time intervals.

The communication module 23 is a communication interface for connecting the servers 20 to the network N1. The communication module 23 includes, for example, a network interface board and a wireless communication interface for wireless communication.

Next, the vehicle 10 includes a control unit 11, a storage unit 12, a communication module 13, a position information sensor 14, and a touch panel 15. The control unit 11 is an arithmetic unit that controls a device (for example, a car navigation device, an infotainment device, or a head unit) that provides information to a user. The control unit 11 can be realized by an arithmetic processor such as a CPU.

Similarly to the storage unit 22 of the server 20, the storage unit 12 includes a main storage device and an auxiliary storage device. The storage unit 12 stores vehicle information 121 and user information 122. The vehicle information 121 and the user information 122 have the same configuration as the vehicle information 221 and the user information 222 stored in the storage unit 22 of the server 20. The control unit 11 transmits the vehicle information 121 and the user information 122 to the server 20 at predetermined time intervals in accordance with an information provision policy to be described later.

The communication module 13 is a communication interface for connecting the vehicles 10 to the network N1. The communication module 13 includes, for example, a network interface board and a wireless communication interface for wireless communication. The position information sensor 14 acquires position information (for example, latitude and longitude) of the vehicle 10 at a predetermined cycle. The position information sensor 14 is, for example, a Global Positioning System (GPS) receiver, a radio Local Area Network (LAN) communicator, or the like. The position of the vehicle 10 acquired by the position information sensor 14 is stored in the storage unit 12 as a part of the vehicle information 121. In the present embodiment, the position of the vehicle 10 detected by the position information sensor 14 is included in the vehicle information 121, but the detected values of various sensors (for example, speed sensors) attached to the vehicle 10 may be included in the vehicle information, not limited to the position of the vehicle 10. The touch panel 15 is an input/output device that receives an input operation performed by a user and presents information to the user.

The user terminal 40 is, for example, a computer used by an individual, such as a personal computer, a smartphone, a mobile phone, a tablet computer, or a personal information terminal. The user terminal 40 includes a control unit 41, a storage unit 42, a communication module 43, a position information sensor 44, and a touch panel 45. The control unit 41 is an arithmetic unit that controls the control performed by the user terminal 40. The control unit 41 can be realized by an arithmetic processor such as a CPU.

Similarly to the storage unit 22 of the server 20, the storage unit 42 includes a main storage device and an auxiliary storage device. The storage unit 42 stores user information 421. The user information 421 includes information on a user ID, a name, an address, and an e-mail address of the owner of the user terminal 40. The storage unit 42 stores an application program (hereinafter, simply referred to as an application) related to user information.

Figure 4:
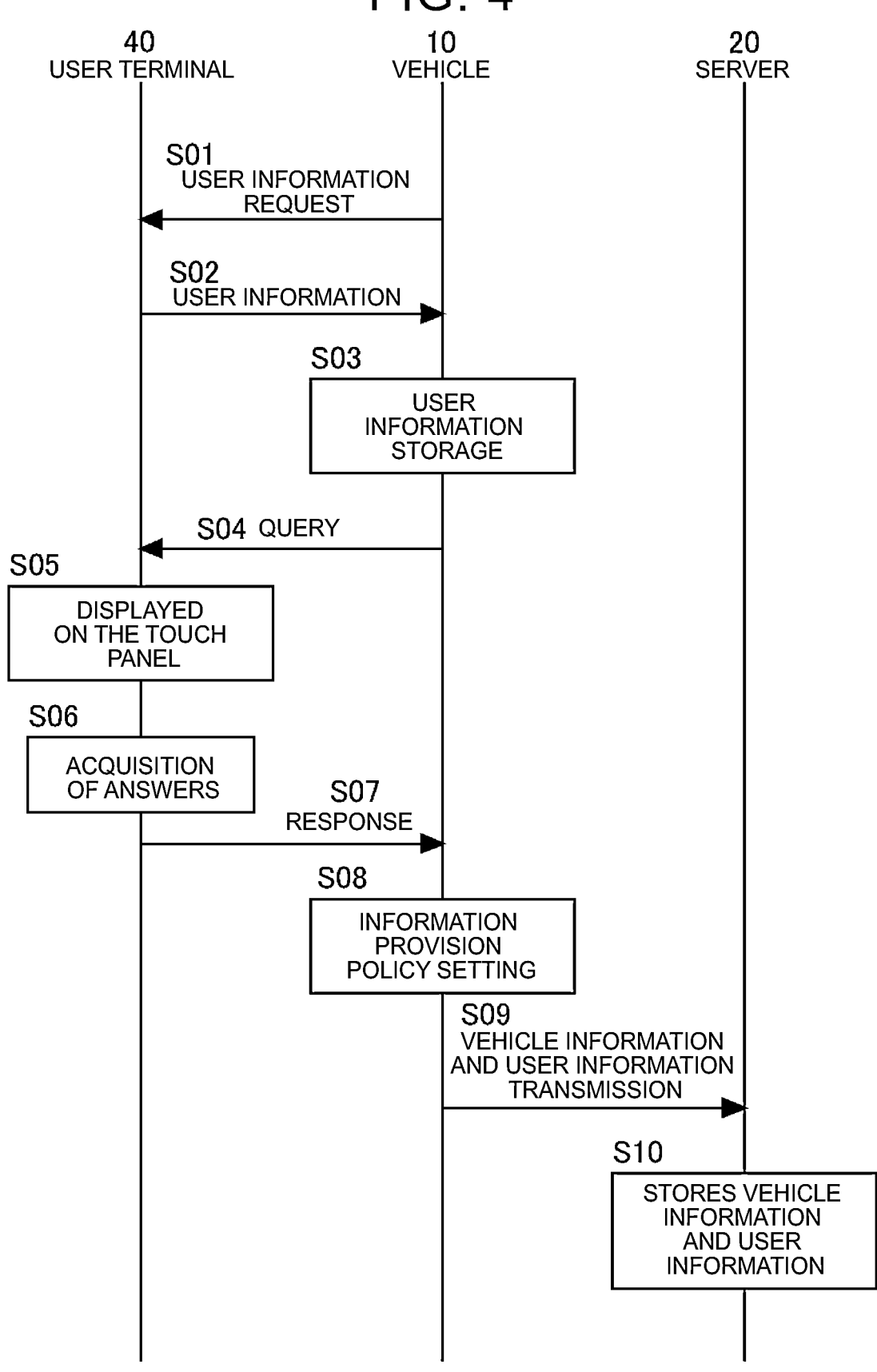
FIG. 4 is a sequence diagram of processing of the system according to the first embodiment.

Next, the entire processing of the system 1 according to the first embodiment will be described. FIG. 4 is a sequence diagram of processing performed by the system 1 according to the first embodiment. It is assumed that communication between the user terminal 40 and the vehicle 10 and communication between the vehicle 10 and the server 20 are established.

When the user terminal 40 enters the range of the short-range wireless communication of the vehicle 10 when the user who has carried the user terminal 40 rides on the vehicle 10, communication between the vehicle 10 and the user terminal 40 is established, and the control unit 11 of the vehicle 10 requests the user terminal 40 for user data (S01). This request is made each time the user rides the vehicle 10. The control unit 41 of the user terminal 40 transmits the user information 421 stored in the storage unit 42 to the vehicles 10 (S02). The control unit 11 of the vehicle 10 causes the storage unit 22 to store the received user information 421 as the user information 122 (S03).

Next, the control unit 11 of the vehicle 10 transmits, to the user terminal 40, an inquiry as to whether or not to agree to provide the user information (S04). The inquiry includes, for example, a command for causing the touch panel 45 to display an image for activating an application of the user terminal 40 and causing the user to input an answer as to whether or not to agree to the provision of the user information. Further, a command for displaying a sentence describing what kind of information is transmitted to the server 20 also on the touch panel 45 may be included when the user agrees.

In the user terminal 40 that has received this inquiry, the control unit 41 causes the touch panel 45 to display an image for causing the user to input an answer as to whether or not to agree to the provision of the user information (S05). In this case, for example, "Do you agree to provide your personal information? A word such as "agree" is displayed, and a selection button corresponding to each of "agree" and "disagree" is displayed. Further, when the user agrees, a sentence describing what kind of information is transmitted to the server 20 may be further displayed on the touch panel 45. For example, it is conceivable that the information to be transmitted to the server 20 differs depending on the combination of the user who is riding on the vehicle and the vehicle 10. In such a case, the control unit 11 of the vehicle 10 determines the information to be transmitted to the server 20 based on the combination of the user and the vehicle 10. The relationship between the combination of the user and the vehicle 10 and the information transmitted to the server 20 is stored in the storage unit 12. Then, when the user taps any one of "agree" and "disagree", the control unit 41 of the user terminal 40 acquires the answer of the user (S06). The control unit 41 of the user terminal 40 transmits an answer to the vehicle 10 in response to the tapped button (S07). Note that the application related to the user information installed in the user terminal 40 may automatically answer. For example, whether to automatically answer may be set by the user.

The control unit 11 of the vehicle 10 that has received the answer from each user terminal 40 sets an information provision policy according to the answer. This information provision policy is a policy regarding information to be transmitted to the server 20, and indicates what information is to be transmitted or not to be transmitted. For example, when all of the users agree to provide the user information, when the vehicle information 121 is transmitted to the server 20, the information provision policy is set so that the user information 122 is linked and transmitted. On the other hand, when some or all users do not agree to provide the user information, the information provision policy is set so as not to provide all the user information 122. In this case, only the vehicle information 121 is transmitted to the server 20. As another example, if some users do not agree to provide user information, an information provision policy may be set so that only the user information 122 corresponding to the agreed user is provided in association with the vehicle information 121 without providing the user information 122 of the user who has not agreed.

Then, the control unit 11 of the vehicle 10 transmits the vehicle information 121 and the user information 122 to the servers 20 in accordance with the information provision policy (S09). At this time, when an information provision policy that does not provide the user information 122 is set, only the vehicle information 121 is transmitted to the server 20. The control unit 21 of the server 20 causes the storage unit 22 to store the received vehicle information 121 and the user information 122 as the vehicle information 221 and the user information 222 (S10). The vehicle information 221 and the user information 222 are analyzed by the server 20, for example, and provide a service based on the analysis result to a user riding on the vehicle 10. As another example, the service may be provided by another server other than the server 20. In this case, the control unit 21 may provide the analysis results of the vehicle information 221 and the user information 222 to other servers. Here, in S02, the user data may be transmitted to the servers 20. Then, in S04, an inquiry may be transmitted from the servers 20 to the user terminals 40. The server 20 may also receive the answer in S07, and the control unit 21 of the server 20 may also set the information provision policy in S08. Then, the information may be provided to another server in accordance with the information provision policy.

As described above, according to the present embodiment, each user riding on the same vehicle 10 can determine whether or not to provide user information. This makes it possible to more appropriately protect the personal information.

Second Embodiment

In the second embodiment, a representative is determined from the riding users, and whether or not the representative agrees to provide the user information is determined.

Figure 5:
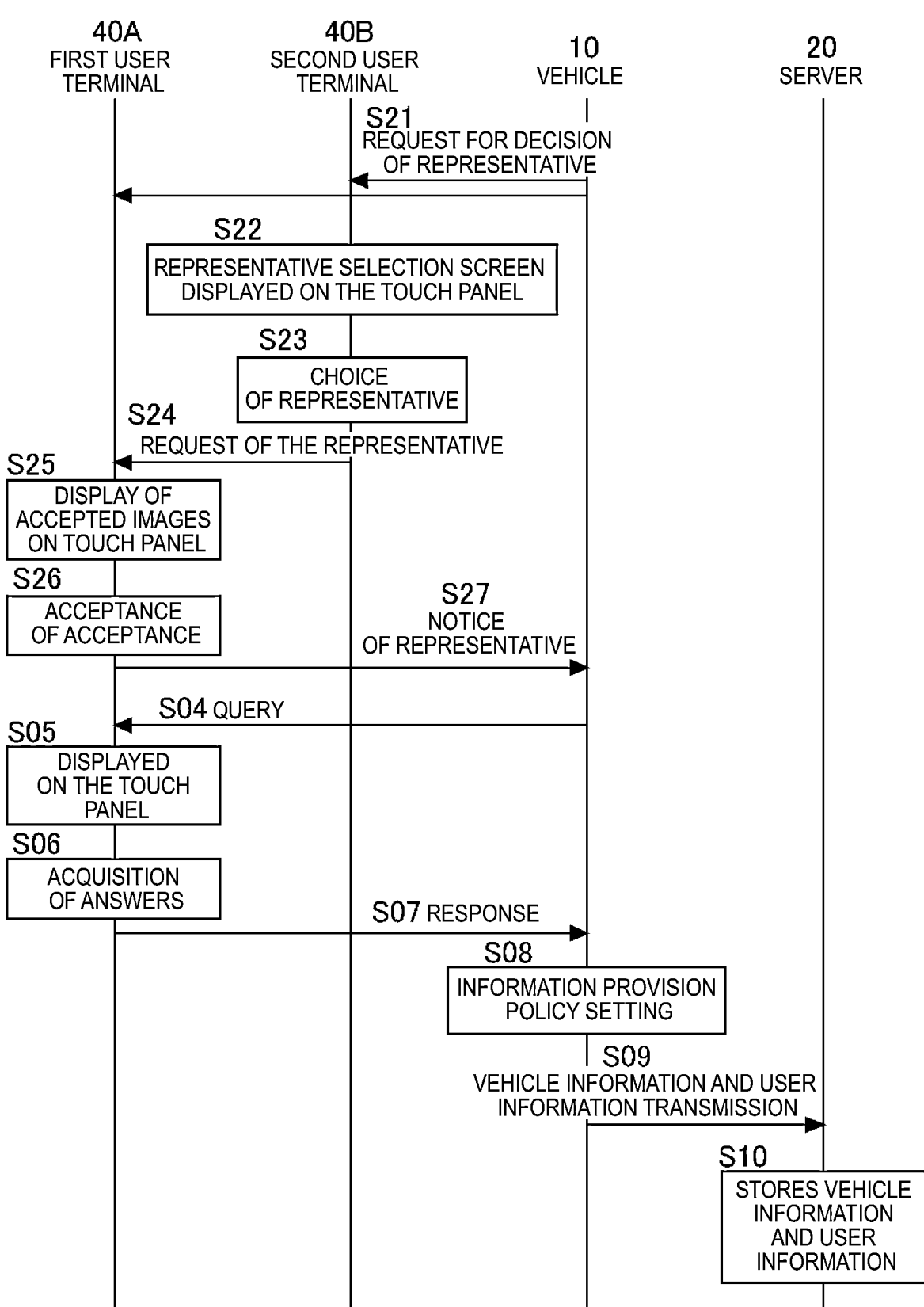
FIG. 5 is a sequence diagram of a process of the system according to the second embodiment.

FIG. 5 is a sequence diagram of processing performed by the system 1 according to the second embodiment. The same processing as in the sequence diagram shown in FIG. 4 is denoted by the same reference numerals, and the description thereof is omitted. In the example illustrated in FIG. 5, the first user is determined as the representative. The representative transmits a reply to the vehicle 10 on behalf of the representative. Since the operation of the third user terminal 40C is the same as that of the second user terminal 40B, the explanation thereof will be omitted. FIG. 5 illustrates a process after S01, S02, S03 process illustrated in FIG. 4 is executed for the respective user terminals 40.

After the control unit 11 of the vehicle 10 causes the storage unit 22 to store the received user information 421 as the user information 122, the control unit 11 of the vehicle 10 transmits a request for determining a representative to the user terminal 40 (S21). The request includes, for example, a command to activate an application of the user terminal 40 and display an image for selecting a representative on the touch panel 45. For example, the control unit 11 of the vehicle 10 specifies the name of each user on the vehicle 10 based on the user information 122, and displays a button for selecting the name on the touch panel 45 of each user terminal 40. Further, a command for displaying a sentence describing what kind of information is transmitted to the server 20 on the touch panel 45 may be included in response to the representative. Then, the control unit 41 of the user terminal 40 causes the names of the respective users to be selectably displayed on a screen for allowing the representative to be selected, and further causes a word such as "Please select a representative" to be displayed (S22).

As another example of S21 process, for example, the user terminals 40 existing inside the vehicles 10 may communicate with each other, and the control unit 41 of each user terminal 40 may transmit information regarding the name of the user. Thus, information regarding the names of the users may be acquired from all the user terminals 40.

Next, when the second user taps the name of the first user displayed on the touch panel 45, the control unit 41 of the second user terminal 40B receives a selection of the first user as a representative (S23). Thereafter, the control unit 41 of the second user terminal 40B transmits a request to be a representative to the first user terminal 40A corresponding to the selected first user (S24). The user ID of the second user is linked to the request. A similar request is also transmitted from the third user terminal 40C to the first user terminal 40A.

When the control unit 41 of the first user terminal 40A receives a request to be a representative from all the user terminals 40 that can communicate inside the vehicle 10, it displays an image on the touch panel 45, for example, describing "Do you accept to be a representative" (S25). Furthermore, the control unit 41 of the first user terminal 40A causes the touch panel 45 to display a button capable of selecting one of "yes" and "no". When the first user taps the "Yes" button, the control unit 41 of the first user terminal 40A accepts the first user's acceptance (S26). Then, the control unit 41 of the first user terminal 40A notifies the vehicle 10 that the representative is the first user (S27). When a request to be a representative is not received from some of the user terminals 40, the first user terminal 40A may not be allowed to press the "Yes" button. In addition, the notification in S27 may be transmitted so that the user ID of all the users who have made the request to be the representative to the first user is known.

The control unit 11 of the vehicle 10 transmits, to the first user terminal 40A corresponding to the first user who is the representative, an inquiry as to whether or not to agree to the provision of the user information (S04). The first user responds as a representative. The subsequent processing is the same as in FIG. 4.

In the process of the above S24, the second user terminal 40B transmits a request as a representative to the first user terminal 40A, but as another example, the second user terminal 40B may notify the vehicle 10 of the representative. When the representatives notified from all the user terminals 40 match, S04 process may be executed for the user terminals 40 of the representatives.

In addition, a representative may be stored in the storage unit 42 of each user terminal 40. For example, it is assumed that the first user is stored as a representative in the storage unit of the second user terminal 40B. When the first user terminal 40A corresponding to the first user is present inside the vehicle 10, the control unit 41 of the second user terminal 40B transmits a request as a representative to the first user terminal 40A without the second user operating the second user terminal 40B.

As described above, according to the present embodiment, by determining the representative, it is possible to answer whether or not the representative agrees with the provision of the user information.

Third Embodiment

In the third embodiment, the server 20 that has received the user information provides an incentive to each user terminal 40. At this time, an incentive may be given from the server 20 to the user terminal 40 via the vehicle 10, a direct incentive may be given from the server 20 to the user terminal 40, or an incentive may be given from the vehicle 10 to the user terminal 40 regardless of the server 20.

This incentive is an incentive for providing user information. It should be noted that determining the representative described in the second embodiment may be a condition for providing an incentive. Further, the incentive may be changed according to the set information provision policy. For example, the incentive may be increased as more information is transmitted to the server 20. The incentive may be cash, a coupon, a gift certificate, or a point, etc. The incentive may be available to the user at the destination of the vehicle 10. In this way, the user can be prompted to agree to the provision of the user information.

Fourth Embodiment

When the user gets on and off in the vehicle 10, the information provision policy may be set every time the user gets on and off. For example, even a user who has agreed to provide the user information may not agree to provide the user information if the user in the vehicle 10 is subsequently replaced. It is also conceivable to set a user who has ridden later as a representative. The control unit 11 of the vehicle 10 communicates with the user terminal 40 of the riding user to monitor whether or not the user gets on or off.

Figure 6:
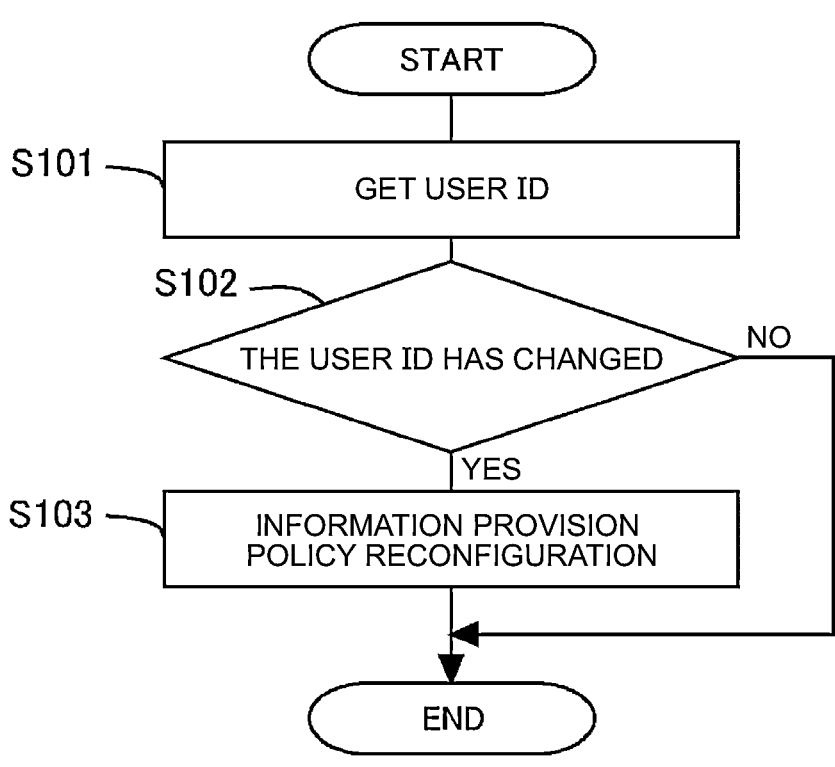
FIG. 6 is a flow chart of a process performed by the vehicle according to of the fourth embodiment.

FIG. 6 is a flowchart of processing in the vehicle 10 according to the fourth embodiment. The processing illustrated in FIG. 6 is executed in the vehicle 10 at a predetermined cycle. In S101, the control unit 11 of the vehicle 10 acquires the user ID from the user terminal 40 existing inside the vehicle 10. At this time, the user information may be acquired. In S102, the control unit 11 of the vehicle 10 determines whether or not there has been a change in the user ID since the previous time. If an affirmative determination is made in S102, the process proceeds to S103, and the control unit 11 of the vehicle 10 resets the information-providing policy. In this case, for example, the processing illustrated in FIG. 4 or FIG. 5 may be performed. On the other hand, if a negative determination is made in S103, the control unit 11 terminates the routine. In this way, it is possible to change the information provision policy in accordance with the getting on and off of the user.

What is claimed is:

1. An information processing device comprising:

a processor configured to set a policy for providing user information about a plurality of users riding on the same vehicle according to permission information indicating whether all of the users riding on the same vehicle agree to provide the user information, wherein the processor is configured to:

receive permission information transmitted from at least one user terminal while the same vehicle is being ridden by the plurality of users;

set a first policy of transmitting information about the vehicle in association with the user information about the users when the permission information indicating that all of the users agree to provide the user information is received from the at least one user terminal;

set a second policy of transmitting the information about the vehicle without being associated with the user information of at least a part of the users, when the permission information indicating that the at least a part of the users does not agree to provide the user information is received from the at least one user terminal; and provide the user information based on the first policy or the second policy.

2. The information processing device according to claim 1, wherein:

a terminal of a representative of the users receives the permission information transmitted from each of the user terminals of the users; and the processor sets the policy according to the permission information transmitted from the terminal of the representative.

3. The information processing device according to claim 2, wherein the representative is determined by the users.

4. The information processing device according to claim 1, wherein the processor generates an incentive corresponding to the users according to the set policy.

5. The information processing device according to claim 1, wherein the policy is reset in response to a change made in the users riding on the same vehicle.

6. The information processing device according to claim 1, wherein the permission information is received from each of the user terminals, each of the user terminals indicating whether the user agrees to provide the user information.

7. The information processing device according to claim 1, wherein the second policy is not associated with the user information of all the users riding the same vehicle.

* * * * *